(No Model.)
E. B. ANDROSS.
AUTOMATIC TWINE HOLDER.
No. 475,173. Patented May 17, 1892.
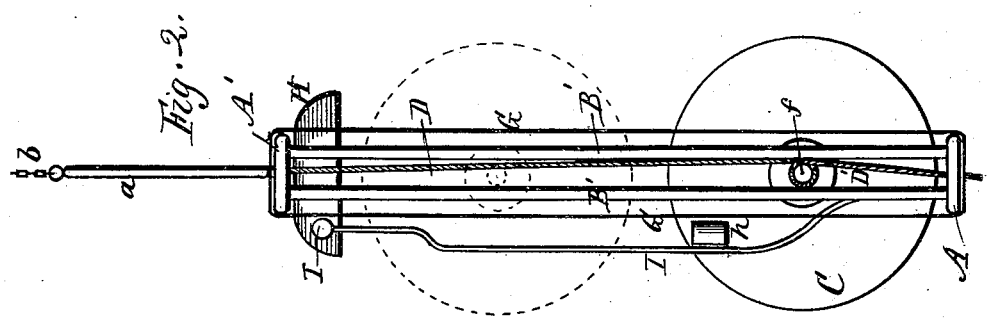
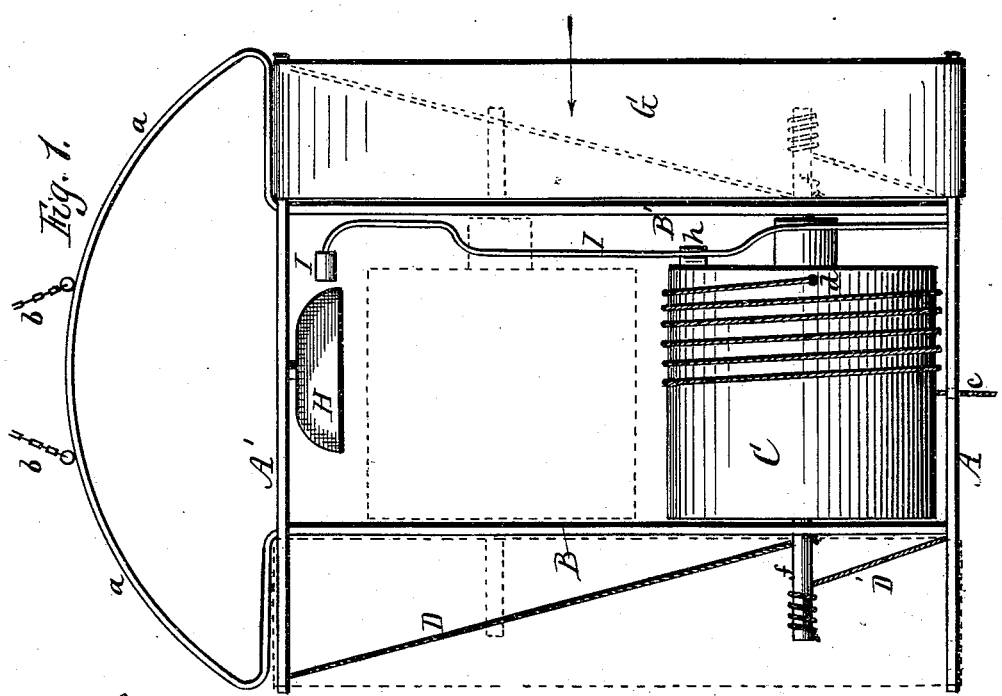
Witnesses.
Inventor
Edward B. Andross,
R. F. Osgood,
Atty.

UNITED STATES PATENT OFFICE.

EDWARD B. ANDROSS, OF BROCKPORT, NEW YORK.

AUTOMATIC TWINE-HOLDER.

SPECIFICATION forming part of Letters Patent No. 475,173, dated May 17, 1892.

Application filed April 14, 1890. Serial No. 347,903. (No model.)

*To all whom it may concern:*

Be it known that I, EDWARD B. ANDROSS, of Brockport, in the county of Monroe and State of New York, have invented a certain new and useful Improvement in Automatic Twine-Holders; and I do hereby declare that the following is a full, clear, and exact description of the same, reference being had to the drawings accompanying this specification.

My improvement relates to automatic twine-holders for stores and other places. The ball of twine is placed in a cylinder and the loose end is passed out through a hole near one end of the cylinder. The cylinder has journals that rest in vertical ways, which allows the cylinder to rise and fall. To the journals are attached cords which wind thereon. When the twine is drawn out, the cylinder is rotated and the winding of the cords on the journals causes said cylinder to be raised in the ways. When the twine is released again, the cylinder falls of its own weight and winds up the slack of the twine on its surface.

The invention consists in the construction and arrangement of parts hereinafter described and claimed.

In the drawings, Figure 1 is a front elevation of the apparatus, showing the cylinder in the lowered position and showing one of the advertising ribbons or bands removed from place to exhibit the winding apparatus. Fig. 2 is a side elevation of Fig. 1, looking in the direction of the arrow in the above-named figure.

A and A' indicate two cross-pieces at top and bottom, which constitute the frame.

B B and B' B' are two pairs of vertical wires or rods, which connect the cross-pieces and constitute the ways. The wires constituting each pair are located at such distance apart as to give space for the journals of the cylinder to rest therein and move up and down. The frame is suspended by any convenient means, that shown in the drawings being a loop or bow *a*, attached to chains or cords *b b*.

C is the cylinder that contains the ball of twine. The twine is inserted through a suitable door, and its loose end *c* is passed out through a hole *d* near one end of the cylinder, and thence it is passed down through a hole in the center of the bottom cross-piece A. The cylinder has journals *f f*, which pass between the wires B B' and project some distance beyond, as shown in Fig. 1.

D D are cords attached at one end to the upper cross-piece A' and at the other to the journals *f f* near one end. These cords are located above the journals.

D' D' are other cords attached at one end to the lower cross-piece A and at the other to the journals *f f* at the ends opposite from the attachment of the cords D D. When one set of cords wind up on the journals, the others unwind, and vice versa.

The operation is as follows: The loose end of the twine after passing through the hole *d* is coiled several times around the cylinder, as shown in Fig. 1. Then when the twine is drawn down to tie a package or for other purposes it turns the cylinder and causes the cords D D to wind up on the journals *f f* and the other cords D' D' to unwind. The winding of the upper cords D D shortens them and raises the cylinder in the frame, as indicated by the dotted lines in Fig. 1. When the twine is released, the weight of the cylinder causes it to fall and wind up the loose end of the twine. The cylinder or ball holder acts as its own weight, thus avoiding the use of extra weights, as in some other devices of the kind.

The cords D' D' are for the purpose of preventing the over or reverse winding of the upper cords when the cylinder stops suddenly at its lowest point, caused by the momentum of the same. The lower cords prevent this by keeping a firm tension, and are therefore useful.

G G are two endless ribbons or bands of paper or cloth hung on the projecting ends of the cross-pieces A A' and serving as a surface on which to print advertisements.

H is a bell attached to the frame, and I is a hammer attached to a spring-wire I', that extends downward and is secured to the bottom of the frame. *h* is a cam on the end of the cylinder. The spring-wire intercepts the path of the cam in the rotation of the cylinder, and as the latter revolves the cam strikes the wire and causes the hammer to strike the bell. The object of this arrangement is to sound an alarm at each rise of the twine-holder, thereby indicating to the proprietor every time twine is used to bind a package.

He thus has notice of each package that is done up by clerks, and it serves as a preventive of frauds on the part of clerks or others who may use the twine for binding packages or materials obtained in a surreptitious manner. If desired, the twine-holder can be located at the cashier's station and carried over suitable supports to any part of the store. If an alarm is sounded, there is less liability of theft in the establishment. It also obviates the purloining of the twine, which is the source of difficulty in many stores, especially those where the finer and more expensive kinds are used.

Having described my invention, what I claim as new, and desire to secure by Letters Patent, is—

1. In a twine-holder, the combination of a frame provided with vertical ways, a cylinder having projecting journals resting in said ways, cords attached at one end to the frame above the cylinder and at the other to the journals, and other cords attached to the frame below the journals and also to the journals, said cords winding reversely to the upper cords, as shown and described, and for the purpose specified.

2. In a twine-holder, the combination of the vertical ways B B', the cylinder C, with journals running in said ways, the cords D D and D' D', attached to the journals and winding reversely thereon, the cam $h$ on one end of the cylinder, the bell H above the cylinder, and the spring-wire I', provided with the hammer I, said spring-wire having an offset which intersects the passage of the cam, as shown and described, and for the purpose specified.

In witness whereof I have hereunto signed my name in the presence of two subscribing witnesses.

E. B. ANDROSS.

Witnesses:
R. F. OSGOOD,
C. M. WINSLOW.